_(12)_ United States Patent
Kurabayashi

(10) Patent No.: US 11,921,973 B2
(45) Date of Patent: Mar. 5, 2024

(54) CONTENT PLAYBACK PROGRAM AND CONTENT PLAYBACK DEVICE

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/901,532

(22) Filed: Sep. 1, 2022

(65) Prior Publication Data

US 2022/0413687 A1 Dec. 29, 2022

Related U.S. Application Data

(63) Continuation of application No. PCT/JP2021/008230, filed on Mar. 3, 2021.

(30) Foreign Application Priority Data

Mar. 4, 2020 (JP) .................................. 2020-036558

(51) Int. Cl.
*G06F 3/04817* (2022.01)
*A63F 13/533* (2014.01)
*G06F 3/04842* (2022.01)

(52) U.S. Cl.
CPC ........ *G06F 3/04817* (2013.01); *A63F 13/533* (2014.09); *A63F 2300/308* (2013.01); *G06F 3/04842* (2013.01)

(58) Field of Classification Search
CPC .................................................. G06F 3/04817
See application file for complete search history.

(56) References Cited

U.S. PATENT DOCUMENTS

| 2017/0010794 A1* | 1/2017 | Cho ..................... G06F 3/04817 |
| 2017/0053314 A1* | 2/2017 | Glover ............... G06Q 30/0267 |
| 2020/0117341 A1* | 4/2020 | Shim ................... G06F 3/04842 |

FOREIGN PATENT DOCUMENTS

| JP | 2016073575 A | 5/2016 |
| JP | 2018099362 A | 6/2018 |
| KR | 101982325 B1 | 5/2019 |

OTHER PUBLICATIONS

International Search Report issued in International Application No. PCT/JP2021/008230, dated Apr. 6, 2021 (5 pages).
Written Opinion issued in International Application No. PCT/JP2021/008230; dated Apr. 6, 2021 (3 pages).

* cited by examiner

*Primary Examiner* — Roland J Casillas
(74) *Attorney, Agent, or Firm* — Osha Bergman Watanabe & Burton LLP

(57) ABSTRACT

Provided is a content playback program and a content playback device that are capable of selecting a "favorite character" of a user as an application launcher icon, in accordance with the user's progress status of a game. The user selects a single character that is a favorite character from among characters for each of which an already-obtained flag and an icon-setting flag are both set to logical "true", thereby making it possible to set an icon of the favorite character as a game-application launcher icon on a menu screen displayed by an application launch processing unit.

3 Claims, 10 Drawing Sheets

FIG. 6

601
CHARACTER MASTER

| CHARACTER ID | CHARACTER NAME |
|---|---|
| 0001 | TAROU |
| 0002 | JIROU |
| 0003 | SABUROU |
| 0004 | HANAKO |
| 0005 | KIRIKO |
| 0006 | TAMIKO |

603
CHARACTER PARAMETER TABLE

| CHARACTER ID | PARAMETER TYPE | PARAMETER VALUE |
|---|---|---|
| 0001 | LEVEL | 80 |
| 0001 | HP | 370 |
| 0001 | STR01 | 250 |
| 0001 | STR02 | 320 |

602
CHARACTER DATA MASTER

| CHARACTER ID | DATA TYPE | DATA FILE NAME |
|---|---|---|
| 0001 | WHOLE BODY IMAGE | 0001zenshin.png |
| 0001 | 3D DATA | 0001_3d.xxx |
| 0001 | SELF INTRODUTION VOICE 01 | 0001jksk01.ogg |
| 0001 | SELF INTRODUTION VOICE 02 | 0001jksk02.ogg |
| 0001 | TECHNIQUE PATTERN 01 | 0001waza01.yyy |
| 0001 | TECHNIQUE PATTERN 02 | 0001waza02.yyy |
| 0001 | TECHNIQUE NAME VOICE 01 | 0001waza01.ogg |
| 0001 | TECHNIQUE NAME VOICE 02 | 0001waza02.ogg |
| 0001 | ICON IMAGE | 0001icon.png |

604
CHARACTER FLAG TABLE

| CHARACTER ID | FLAG TYPE | FLAG VALUE |
|---|---|---|
| 0001 | ALREADY OBTAINED | TRUE |
| 0001 | ABILITY NODE 01 | TRUE |
| 0001 | ABILITY NODE 02 | FALSE |
| 0001 | ICON SETTING | FALSE |
| 0001 | ICON SPECIFICATION | FALSE |
| 0002 | ALREADY OBTAINED | FALSE |
| 0004 | ALREADY OBTAINED | TRUE |
| 0004 | ABILITY NODE 01 | TRUE |
| 0004 | ABILITY NODE 02 | TRUE |
| 0004 | ICON SETTING | TRUE |
| 0004 | ICON SPECIFICATION | TRUE |

504
APPLICATION ICON TABLE

| APPLICATION NAME |
|---|
| ICON TYPE |
| ICON FILE NAME |

512
APPLICATION MENU TABLE

| APPLICATION NAME |
|---|
| APPLICATION CATEGORY |
| ICON POSITION |

ACQUISITION OF NEW CHARACTER DUE TO COMPLETION OF EVENT OR ONLINE PURCHASE

ACQUISITION OF NEW CHARACTER DUE TO ONLINE PRIZE COMPETITION

UPDATE OF STATUS INFORMATION OF CHARACTER THAT CAN BE SET AS ICON

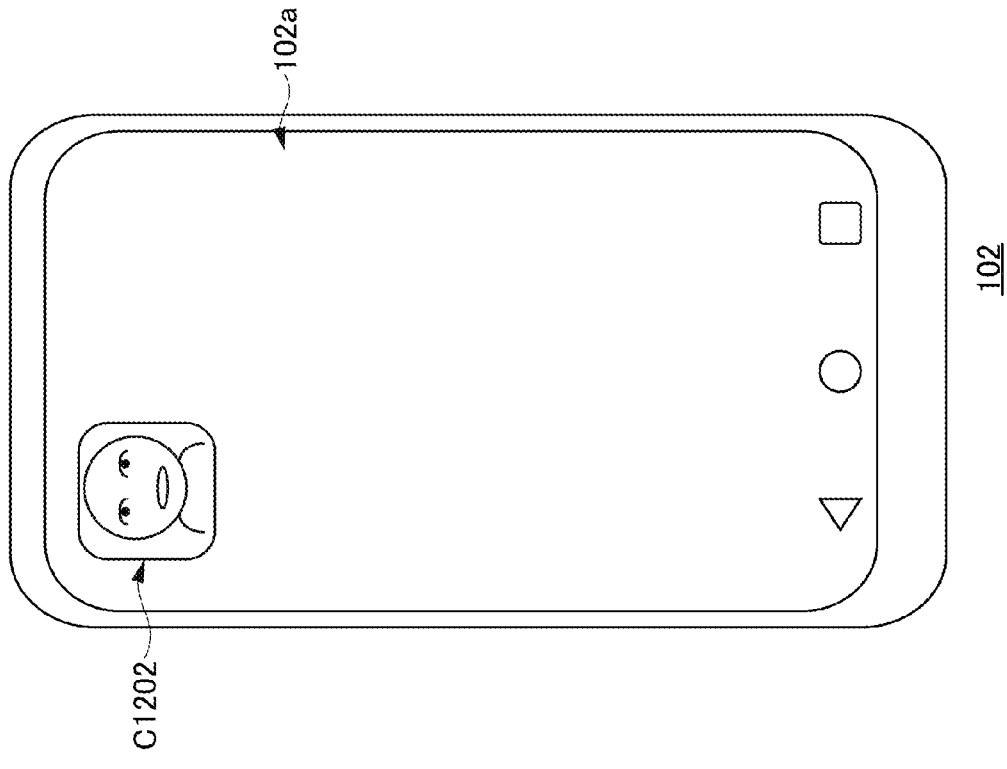
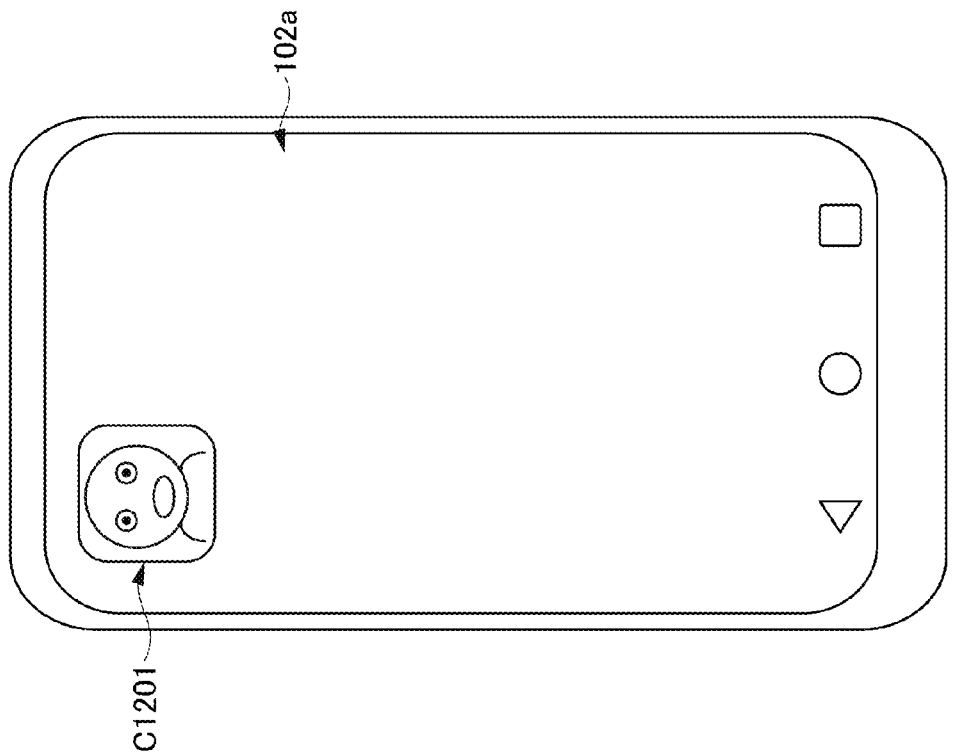

CONTENT PLAYBACK PROGRAM AND CONTENT PLAYBACK DEVICE

TECHNICAL FIELD

The present invention relates to a content playback program and a content playback device.

BACKGROUND ART

The applicant develops and distributes game programs and game services. In recent years, the demand for game programs or game services for smartphones has been increasing more than that for game programs for dedicated game machines.

In particular, many game service providers, including the applicant, provide online game services in which smartphones are connected through the Internet to game servers that provide game content and receive various items of game content via the game servers.

One aspect of such a game is a content playback service having a complex content-playback function obtained by integrating not only an action game element, in which a game character (hereinafter, simply abbreviated to "character") is moved according to an operation by a user, but also a novel-game element, in which a story progresses when characters make a conversation, and a functional element such as an animation video or a web browser.

Various types of ingenuity are exercised in many online game services in order to keep providing the services to many users for as long as possible. For example, rate-determining control is performed on the game progress such that the growth speed of characters in game content is slowed down on purpose. Furthermore, characters in game content are expressed in beautiful and cute illustrations, or a story in which the characters are produced attractively is novelized or animated. Furthermore, voices of popular voice actors are often added to the characters, thus providing many attractive characters.

In particular, illustrations and lines spoken by popular voice actors are added to characters in games, which are fictitious characters, and those characters are attractively produced through novelization, animation, or the like, thereby evoking the users' feelings of strong favor etc. toward the characters (Moeru). This is commonly called "character Moe".

Furthermore, one specific character toward which a user shows favor in particular is commonly called a "favorite character". In particular, this concept of "favorite character" becomes an extremely important selling point in online game services, for determining how to attract many users. Furthermore, "favorite character" is also an important concept in the present invention.

Patent Literature 1 discloses an amusement machine (slot machine) in which, when a player obtains valuable information, the player can feel a sense of accomplishment, a sense of power, etc., whereby the fun is improved. Note that Patent Literature 1 discloses a technique for displaying an icon of a "favorite character" selected by the user, on a play screen.

CITATION LIST

Patent Literature

{Patent Literature 1} Japanese Unexamined Patent Application, Publication No. 2018-99362

SUMMARY OF INVENTION

Technical Problem

Today's smartphones have become widespread as high-performance information terminals having a computational power and a high-resolution display that are equal to those of personal computers. Smartphones can not only function as mobile phones but can also execute various application programs, for web browsing, video playback players, music players, digital cameras, translation, train line guides, map navigation, business software, healthcare, and games, by means of the smartphones.

In order to manage the wide variety of application programs and in order for the user to be able to quickly execute a desired application program, an application program called a home application, a desktop application, or an application launcher is installed in a smartphone. Hereinafter, such an application program is referred to as "home application" in this specification.

The home application displays, on a touchscreen display, each application program with an icon and an abbreviated name of the application program. That is, the home application is an application program for executing each application program in response to a tap operation on the icon of the application program.

Many of the application programs to be installed in smartphones are subjected to predetermined examination by a company that provides the OS and are registered in an online store operated by the company that provides the OS. At that time, only one kind of image file for each icon was allowed to be registered.

In recent years, after iOS (registered trademark) version 10.3, which is provided by Apple Computer, Inc. US, a function for allowing a user to select a favorite icon from among a plurality of icons that are examined in advance by the online store and to change the icon to the selected icon at an arbitrary timing has been provided. That is, it becomes possible that an application program provides a plurality of icons to the user.

If this function can be organically linked with a "favorite character" of the user, it seems that the charm of a game can be further enhanced.

The present invention has been made in view of the above-described problem, and an object thereof is to provide a content playback program and a content playback device capable of selecting a "favorite character" of a user as an application launcher icon in accordance with the user's progress status of the game.

Solution to Problem

In order to solve the above-described problem, the present invention provides a content playback program implemented in a computer for realizing a content playback device having a display unit, an operation unit, a character data master that describes correspondence relationships between character IDs that uniquely identify a plurality of characters and file names of icon image files that show icon images linked with the characters of the character IDs, a character flag table that describes correspondence relationships among the character IDs, already-obtained flags indicating whether the characters of the character IDs have already been obtained by a user, icon-setting flags indicating whether the characters of the character IDs can be set as an icon of an application program, and icon-specification flags indicating whether the characters of the character IDs have been specified as an icon of an application program, and an application icon table that describes a correspondence relationship between information uniquely pointing to an application program and an icon file name indicating a file name of an icon image pointing to the application program.

The content playback program of the present invention realizes: an icon-candidate display processing function of referring to the character flag table and displaying, on the display unit, the icon image files that are linked with the character IDs for which the values of the icon-setting flags are set to logical true; an icon selection processing function of setting, in response to the fact that the user has selected, via the operation unit, one of the plurality of icon images displayed on the display unit, the value of the icon-specification flag, in the character flag table, linked with the character ID selected by the user, to logical true; an icon change processing function of registering the icon image file, in the character data master, linked with the character ID selected by the user, to the icon file name obtained from the application icon table, in response to calling of the icon selection processing function; and an application launch processing function of displaying the icon image of the icon image file on the display unit as an icon for launching the application program, in accordance with the application icon table.

Then, the already-obtained flags can each be set to logical true by executing a character acquisition event for setting the already-obtained flag to logical true, and the icon-setting flags can each be set to logical true by executing a predetermined event for setting the icon-setting flag to logical true.

Advantageous Effects of Invention

According to the present invention, it is possible to select a user's "favorite character" as an application launcher icon in accordance with the user's progress status of the game.

Problems other than that described above, configurations, and advantageous effects will be apparent from the following description of an embodiment.

BRIEF DESCRIPTION OF DRAWINGS

FIG. 6 is a view showing example field configurations and records in various tables.

FIGS. 13A and 13B show example screens that an application launch processing unit displays on a touchscreen display before and after icon change processing is executed.

DESCRIPTION OF EMBODIMENTS

[Content Playback System: Overall Configuration]

Figure 1:
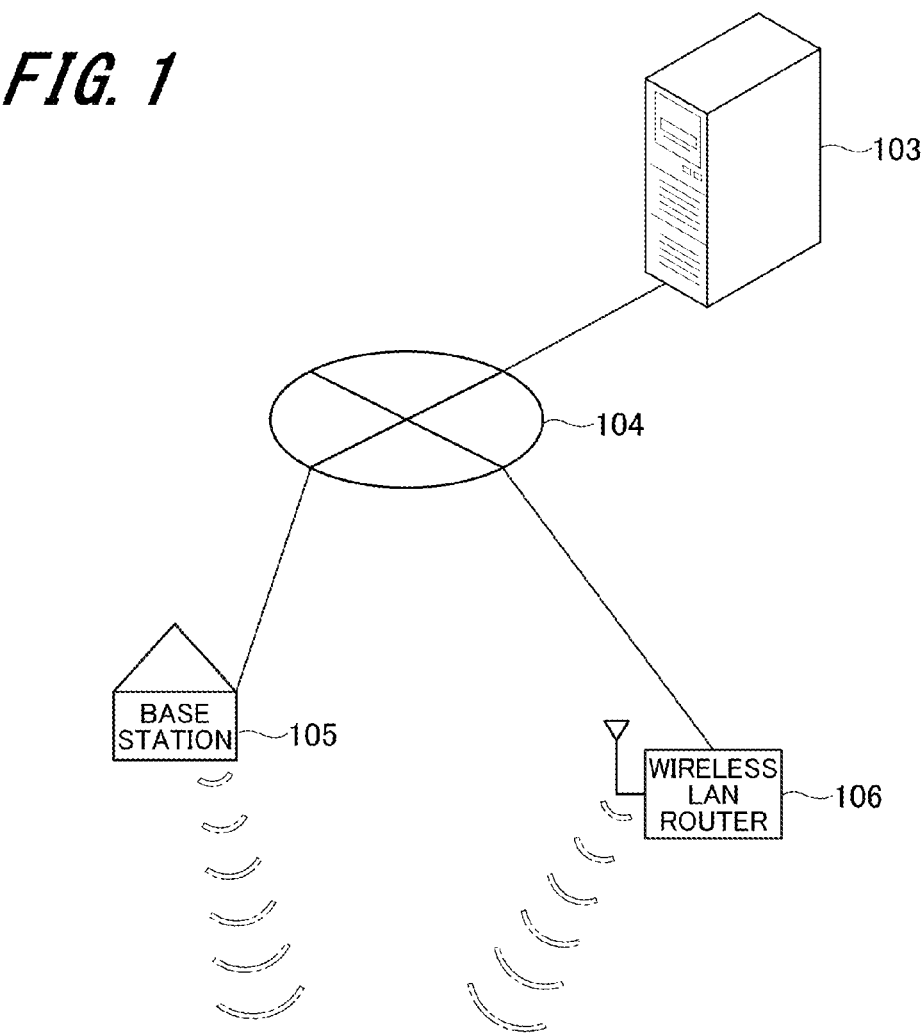
FIG. 1 is a view showing, in outline, a content playback system according to an embodiment of the present invention.

FIG. 1 is a view showing, in outline, a content playback system 101 according to an embodiment of the present invention.

A smartphone loads a game program to function as a content playback device 102. A user operates a touchscreen display 102a of the content playback device 102 to play a game.

As shown in FIG. 1, the content playback device 102 downloads the game program from a game server 103 through the Internet 104 via a base station 105 that performs wide-area wireless communication or a wireless LAN router 106, and executes the game program.

A service provided to the user by the content playback system 101 according to the embodiment of the present invention is game content, and the game content is an online game service in which a plurality of characters appear in a game virtual world.

[Content Playback Device 102: Hardware Configuration]

Figure 2:
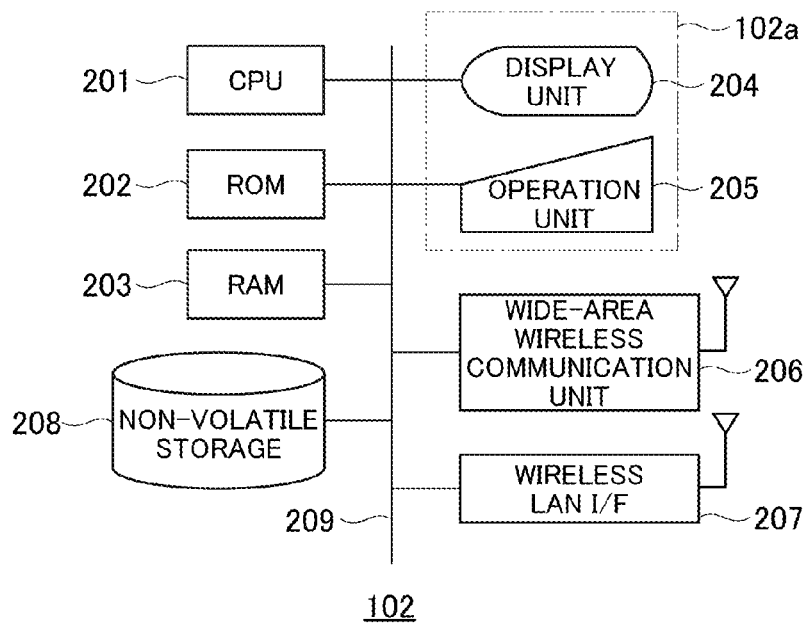
FIG. 2 is a block diagram showing the hardware configuration of a content playback device (smartphone).

FIG. 2 is a block diagram showing the hardware configuration of the content playback device 102 (smartphone).

The content playback device 102, which is a well-known computer, includes a CPU 201, a ROM 202, a RAM 203, a display unit 204, an operation unit 205, a wide-area wireless communication unit 206, a wireless LAN interface 207, and a non-volatile storage 208 that are connected to a bus 209. The display unit 204 is configured of an LCD or the like, and the operation unit 205 is configured of an electrostatic touchscreen or the like.

The content playback device 102 performs communication with the game server 103 via the wide-area wireless communication unit 206 or the wireless LAN interface 207 to send thereto and receive therefrom information needed for the online game service.

[Game Server 103: Hardware Configuration]

Figure 3:
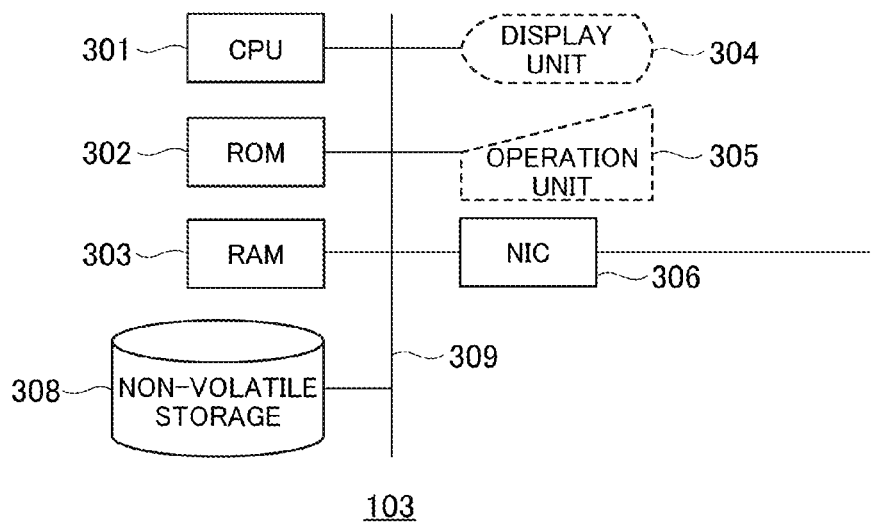
FIG. 3 is a block diagram showing the hardware configuration of a game server.

FIG. 3 is a block diagram showing the hardware configuration of the game server 103.

The game server 103, which is a well-known computer, includes a CPU 301, a ROM 302, a RAM 303, a network interface card (NIC) 306, and a non-volatile storage 308 that are connected to a bus 309.

Note that, in the game server 103, a display unit 304 and an operation unit 305 are not always necessary, thus being shown by dotted lines.

[Game Server 103: Software Function]

Figure 4:
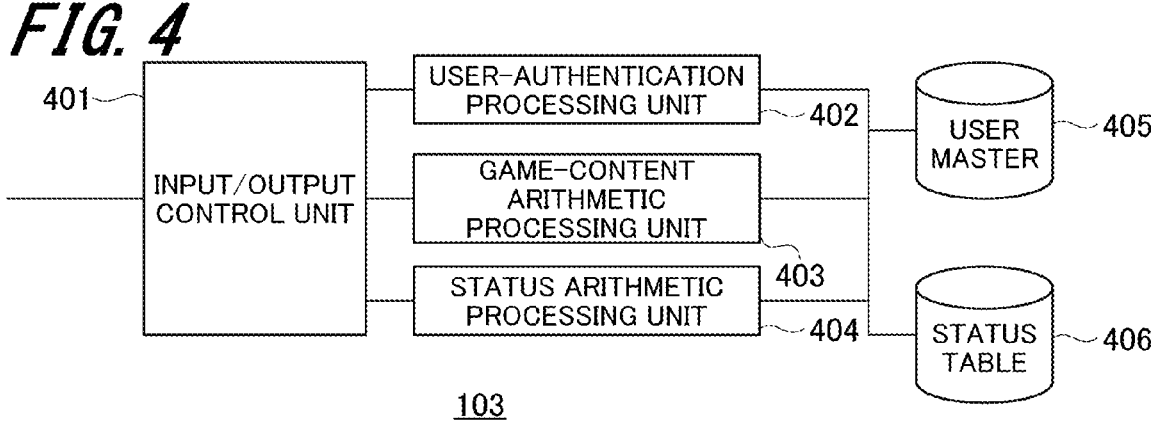
FIG. 4 is a block diagram showing software functions of the game server.

FIG. 4 is a block diagram showing software functions of the game server 103.

Various requests from the content playback device 102 are sent to a user-authentication processing unit 402, a game-content arithmetic processing unit 403, and a status arithmetic processing unit 404 via an input/output control unit 401. Here, the input/output control unit 401 functions as a web server program.

The user-authentication processing unit 402 verifies whether the content playback device 102 that has accessed the game server is a legitimate user, by referring to a user master 405.

If the user-authentication processing unit 402 confirms that the content playback device 102 that has accessed the game server is a legitimate user, the game-content arithmetic processing unit 403 and the status arithmetic processing unit 404 handle those requests.

The game-content arithmetic processing unit 403 performs arithmetic processing related to the game content. For example, the game-content arithmetic processing unit 403 performs transmission and reception of battlefield position information indicating the positions of a plurality of users in a battlefield and event information related to various actions.

The status arithmetic processing unit 404 receives event information sent from the content playback device 102 when the game content is finished or when an item is obtained or discarded, and calculates the event information by applying predetermined arithmetic processing thereto. Then, the status arithmetic processing unit 404 additionally records and/or updates the event information in a status table 406 and then sends back status information to the content playback device 102.

[Content Playback Device 102: Software Function]

Figure 5:
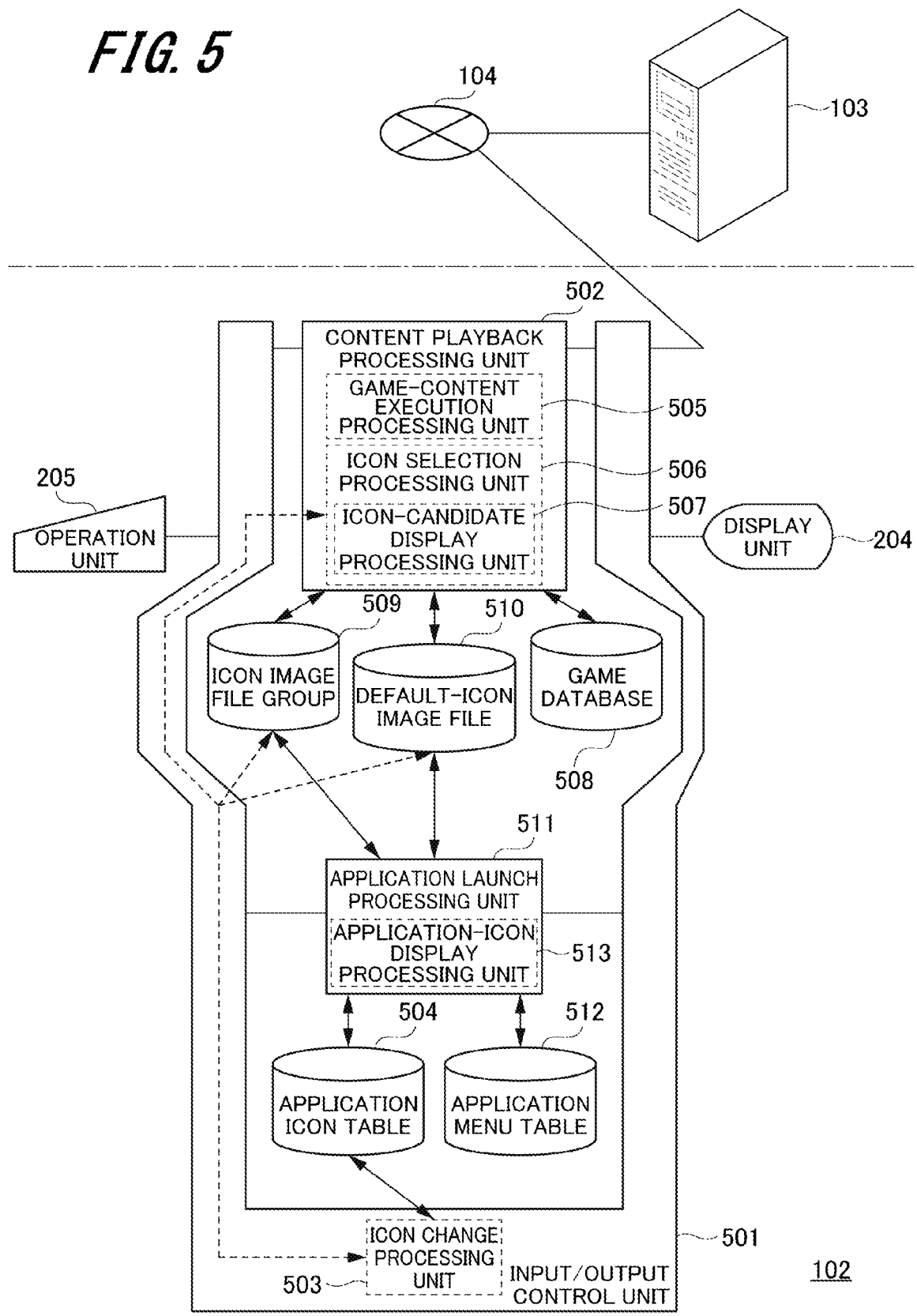
FIG. 5 is a block diagram showing software functions of the content playback device.

FIG. 5 is a block diagram showing software functions of the content playback device 102.

An input/output control unit 501 functions as an OS, interprets operation information obtained at the operation unit 205, and passes the operation information to a content playback processing unit 502 as needed.

Furthermore, the input/output control unit 501 passes screen display data output from the content playback processing unit 502, to the display unit 204.

The input/output control unit 501 includes an icon change processing unit 503 that realizes an icon change processing function. When an icon change request is received from another application program, the icon change processing unit 503 enters required items in an application icon table 504. The application icon table 504 corresponds to "info.plist" in iOS (registered trademark), for example.

The content playback processing unit 502 is the body of the game program.

The content playback processing unit 502 includes a game-content execution processing unit 505 and an icon selection processing unit 506 that realizes an icon selection processing function. The icon selection processing unit 506 includes an icon-candidate display processing unit 507 that realizes an icon-candidate display processing function.

The game-content execution processing unit 505 executes display and playback with respect to various items of content in accordance with operations etc. of the user. That is, the game-content execution processing unit 505 performs: control of display and actions of game characters based on scenario data etc.; display of image files; playback of moving-image files; playback of sound files; display of text data; etc.

Furthermore, the content playback processing unit 502 sends event information generated through playback etc. of the game content to the game server 103, receives status information from the game server 103, and records the status information in a game database 508.

The icon selection processing unit 506 performs a dialogue with the icon change processing unit 503 of the input/output control unit 501 on the basis of an icon specifying request sent by the user via the operation unit 205. Then, the icon selection processing unit 506 executes processing of setting a particular icon-image-file name included in an icon image file group 509, for an icon of the content playback processing unit 502.

Note that, if the processing of the icon selection processing unit 506 has never been executed, a default-icon image file 510 is set for an icon of the content playback processing unit 502.

An application launch processing unit 511 is a home application that has an application launch processing function and that realizes processing of launching application programs. The application launch processing unit 511 displays application programs as icons on the display unit 204. Then, in response to a tap operation on an icon, the application launch processing unit 511 executes the corresponding application program. Note that, when executing the corresponding application program, the application launch processing unit 511 refers to the application icon table 504 and an application menu table 512.

The application launch processing unit 511 includes an application-icon display processing unit 513. The application-icon display processing unit 513 reads the application menu table 512 and displays application programs with icons on the display unit 204.

FIG. 6 is a view showing example field configurations and records in various tables.

The game database 508, in/from which the content playback processing unit 502 writes/reads information, includes a character master 601, a character data master 602, a character parameter table 603, and a character flag table 604.

The character master 601 has a character-ID field and a character-name field. The character-ID field stores character IDs that uniquely identify characters, and the character-name field stores character names.

The character data master 602 has a character-ID field, a data-type field, and a data-file-name field.

The character-ID field is the same as that in the character master 601.

The data-file-name field stores the file names of various data files.

The data-type field stores information indicating the types of the files corresponding to the file names stored in the data-file-name field. Although the types of the files are written in word names in FIG. 6 for ease of understanding, file type IDs that ensure uniqueness of the types of the files are actually stored.

A value in the data-type field corresponds to a field name in the table. Among values in the data-type field, a data type "icon image" is directly related to the present invention.

Therefore, it can be interpreted that the value "icon image" in the data-type field is equivalent to an icon-image field.

For example, in FIG. 6, it can be interpreted that, in the record of the value "icon image" in the data-type field, the value (data file name) stored in the data-file-name field is the value in the icon-image field, i.e., "0001icon.png".

The character parameter table 603 has a character-ID field, a parameter-type field, and a parameter-value field.

The character-ID field is the same as that in the character master 601.

The parameter-value field stores parameter values of the following parameter types.

The parameter-type field stores information (parameter types) indicating the types of the parameter values stored in the parameter-value field. Although the types of the parameter values are written in word names in FIG. 6 for ease of understanding, parameter-type IDs that ensure uniqueness of the parameter types are actually stored.

A value in the parameter-type field corresponds to a field name in the table. Therefore, it can be interpreted that a value "LEVEL" in the parameter-type field is a LEVEL field. Then, it can be interpreted that, in the record of the value "LEVEL" in the parameter-type field, the value (parameter value) stored in the parameter-value field is the value in the LEVEL field.

The character flag table 604 has a character-ID field, a flag-type field, and a flag-value field.

The character-ID field is the same as that in the character master 601.

The flag-value field stores either "true" or "false" as a flag value in the flag type.

The flag-type field stores information (flag type) indicating the types of the flag values stored in the flag-value field. Although the types of the flag values are written in word names in FIG. 6 for ease of understanding, flag type IDs that ensure uniqueness of the flag types are actually stored.

Among values in the flag-type field, flag types "already obtained", "icon setting", and "icon specification" are directly related to the present invention.

The already-obtained flag, which is a first flag, is a flag indicating whether the corresponding character has already been obtained by the user. Examples of means for the user to obtain a character include, for example, a condition that a specific event in the game content has finished normally, a condition that a new character has been obtained due to an online prize competition ("gacha (registered trademark)"), and a condition that a desired character has been purchased online. These conditions can all be expressed as character acquisition events for setting the already-obtained flag to logical "true".

In FIG. 6, the user has already obtained the characters corresponding to the character IDs "0001" and "0004" because the corresponding already-obtained flags are set to "true", and the user has not obtained the character corresponding to the character ID "0002" because the corresponding already-obtained flag is set to "false".

The icon-setting flag, which is a second flag, is a flag indicating whether the corresponding character can be set as an icon. Examples of means for the user to be able to set the character as an icon include, for example, a condition that the user has normally finished a specific event in the game content, a condition that a predetermined status value has reached a predetermined threshold or greater due to an item given to the corresponding character by the user, and a condition that the character for which the icon-setting flag had been set to logical true in advance has been obtained through an online prize competition or online purchase. These conditions can all be expressed as predetermined events for setting the icon-setting flag to logical "true".

Note that the already-obtained flag having been set to logical "true" is a prerequisite for setting the icon-setting flag to logical "true".

In FIG. 6, for the character ID "0001", an ability-node-01 flag is set to "true" whereas an ability-node-02 flag is set to "false". Thus, the game server 103 judges that icon setting cannot be performed, whereby the icon-setting flag is set to "false".

Meanwhile, for the character ID "0004", the ability-node-01 flag and the ability-node-02 flag are both set to "true".

Thus, the game server 103 judges that icon setting can be performed, whereby the icon-setting flag is set to "true".

The icon-specification flag, which is a third flag, is a flag indicating whether the character of the corresponding character ID has been specified as an icon. Therefore, the already-obtained flag and the icon-setting flag having been set to "true" are prerequisites for setting the icon-specification flag to "true".

In FIG. 6, only the character ID "0004" has the icon-setting flag set to "true", and, in response to this, the icon-specification flag is also set to "true". Although not shown in FIG. 6 on account of limited space, there are many records of character IDs for each of which the icon-specification flag is set to "false" even though the icon-setting flag is set to "true".

As described above, only after the first flag and the second flag for a certain character are both set to logical "true", the third flag for the character can be set to logical "true".

A value in the flag-type field corresponds to a field name in the table. Therefore, it can be interpreted that a value "already obtained" in the flag-type field is an already-obtained-flag field. Then, it can be interpreted that, in each record of the value "already obtained" in the flag-type field, the value (flag value) stored in the flag-value field is the value in the already-obtained-flag field.

It can be interpreted that the value "icon setting" in the flag-type field is an icon-setting-flag field. Then, it can be interpreted that, in each record of the value "icon setting" in the flag-type field, the value (flag value) stored in the flag-value field is the value in the icon-setting-flag field.

It can be interpreted that the value "icon specification" in the flag-type field is an icon-specification-flag field. Then, it can be interpreted that, in each record of the value "icon specification" in the flag-type field, the value (flag value) stored in the flag-value field is the value in the icon-specification-flag field.

The application icon table 504 has an application-name field, an icon-type field, and an icon-file-name field.

The application-name field stores the name of an application program.

The icon-type field stores a flag indicating whether the icon of the application program is the default or has been changed by the user via the application.

The icon-file-name field stores an icon-image-file name if the icon of the application program has been changed by the user via the application.

The application menu table 512 has an application-name field, an application-category field, and an icon-position field.

The application-name field is the same as that in the application icon table 504.

The application-category field stores a category, a page number, or the like for organizing the application icon in the application launch processing unit 511.

The icon-position field stores the position of an icon image displayed on the display unit 204.

Figure 7:
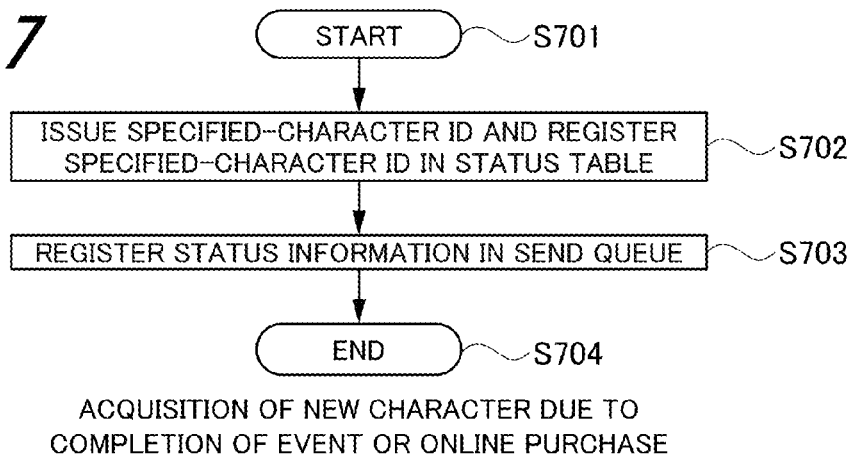
FIG. 7 is a flowchart showing the flow of an operation performed at the game server when a user obtains a new character due to the fact that the user has completed a predetermined event in a game or has purchased the specified character online.

FIG. 7 is a flowchart showing the flow of an operation performed at the game server 103 when the user obtains a new character due to the fact that the user has completed a predetermined event in the game or has purchased the specified character online.

When the processing is started (S701), the status arithmetic processing unit 404 of the game server 103 issues a specified-character ID related to the event or the online purchase and registers the specified-character ID in the status table 406 (S702). Then, the status arithmetic processing unit 404 passes the status information registered in the status table 406 to the input/output control unit 501. In order to send the received status information to the content playback device 102, the input/output control unit 501 registers the status information in a send queue (not shown) (S703) and ends the series of processing steps (S704).

Figure 8:
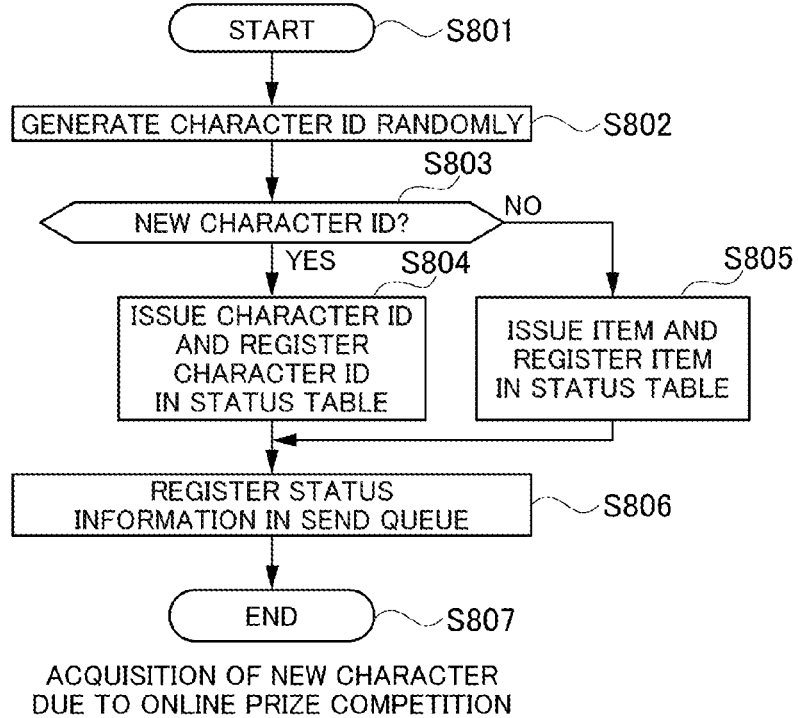
FIG. 8 is a flowchart showing the flow of an operation performed at the game server when the user obtains a new character due to the fact that the user has executed an online prize competition.

FIG. 8 is a flowchart showing the flow of an operation performed at the game server 103 when the user obtains a new character due to the fact that the user has executed an online prize competition.

When the processing is started (S801), the game-content arithmetic processing unit 403 of the game server 103 randomly generates a character ID on the basis of the probability of the prize competition (not shown) that is specified in advance (S802).

Next, the status arithmetic processing unit 404 confirms whether the character ID generated by the game-content arithmetic processing unit 403 is a new character for the user of the user ID (S803).

In Step S803, in the case where it is confirmed that the character ID generated by the game-content arithmetic processing unit 403 is a new character ID for the user of the user ID (YES in S803), the status arithmetic processing unit 404 issues the character ID and registers the character ID in the status table 406 (S804).

On the other hand, in Step S803, in the case where it is confirmed that the character generated by the game-content arithmetic processing unit 403 is not a new character ID (NO in S803), the status arithmetic processing unit 404 issues item information about an item that is a substitute prize and registers the item information in the status table 406 (S805).

In either case, the status information registered in the status table 406 is passed to the input/output control unit 501. Then, the input/output control unit 501 registers the received status information in a send queue (not shown) for sending the status information to the content playback device 102 (S806), and ends the series of processing steps (S807).

Figure 9:
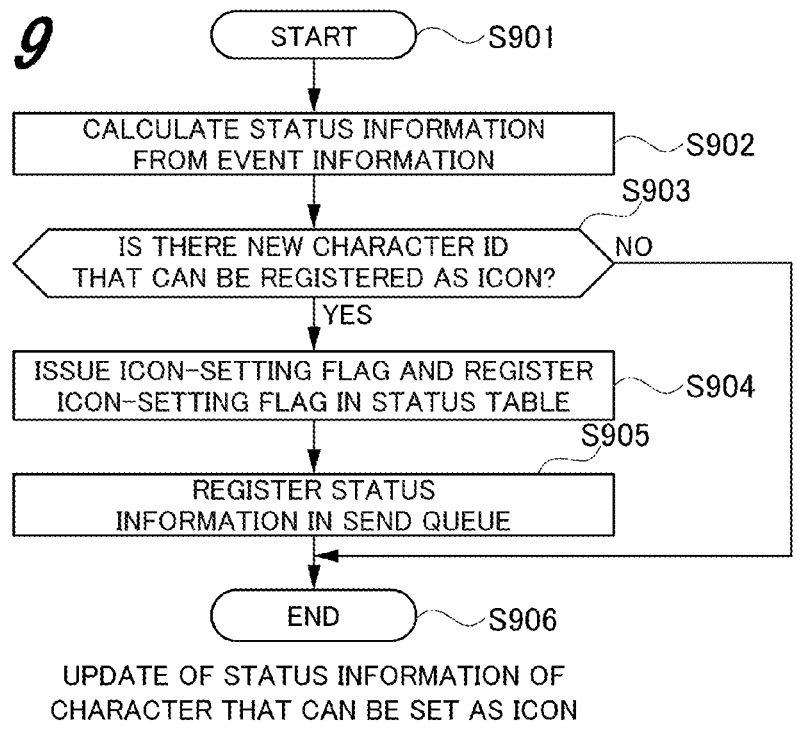
FIG. 9 is a flowchart showing the flow of processing, performed at the game server, in which a predetermined character becomes allowed to be specified as an icon due to the fact that the user has completed some event or has performed various operations on the predetermined character.

FIG. 9 is a flowchart showing the flow of processing performed at the game server 103 when a predetermined character becomes allowed to be specified as an icon due to the fact that the user has completed some event or has performed various operations on the predetermined character.

When the processing is started (S901), the status arithmetic processing unit 404 of the game server 103 calculates status information from event information received from the content playback device 102 (S902).

Next, the status arithmetic processing unit 404 confirms whether a character that can be registered as an icon has newly appeared as a result of the arithmetic processing (S903).

In Step S903, in the case where it is confirmed that a character that meets a condition to be able to be registered as an icon has newly appeared (YES in S903), the status arithmetic processing unit 404 issues "icon-setting flag=true" for this character ID and registers "icon-setting flag=true" in the status table 406 (S904).

Next, the status arithmetic processing unit 404 passes status information registered in the status table 406 to the input/output control unit 501. Then, the input/output control unit 501 registers the received status information in a send queue (not shown) for sending the status information to the content playback device 102 (S905), and ends the series of processing steps (S906).

Furthermore, in Step S903, in the case where a character that meets a condition to be able to be registered as an icon has not appeared (NO in S903), the series of processing steps is ended without doing anything (S906).

Figure 10:
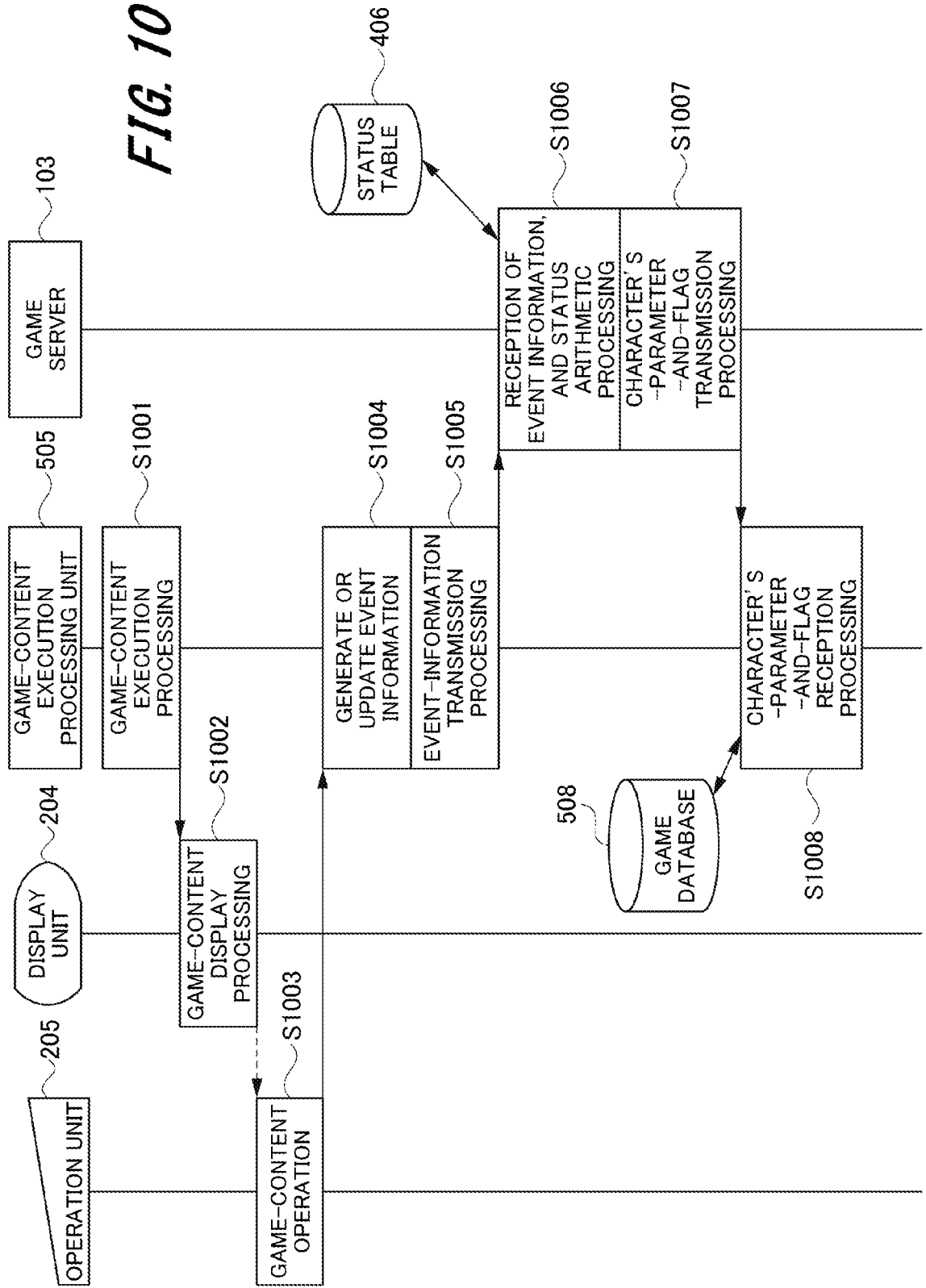
FIG. 10 is a timing chart for explaining the flow of processing performed between the content playback device and the game server.

FIG. 10 is a timing chart for explaining the flow of processing performed between the content playback device 102 and the game server 103.

When the game-content execution processing unit 505 of the content playback device 102 performs execution processing of predetermined game content (S1001), the game content, which is the content of the game, is displayed on the display unit 204 (S1002). The user views the game content displayed on the display unit 204 and performs a predetermined operation (S1003). Examples of the predetermined operation performed in Step S1003 include various operations such as an operation for attacking an enemy in a battle, a prize-competition execution instruction in an online prize competition, and an item input operation for increasing the level of a character.

When information on such an operation is sent to the game-content execution processing unit 505, the game-content execution processing unit 505 generates or updates event information (S1004). Then, the game-content execution processing unit 505 sends the event information to the game server 103 (S1005).

When the event information is received from the content playback device 102, the game server 103 performs status arithmetic processing and updates the status table 406 (S1006). Then, the game server 103 sends status information about parameters, flags, etc. of characters of the user, to the content playback device 102 (S1007).

When the status information is received from the game server 103, the game-content execution processing unit 505 of the content playback device 102 registers the status information in the game database 508 (S1008).

Figure 11:
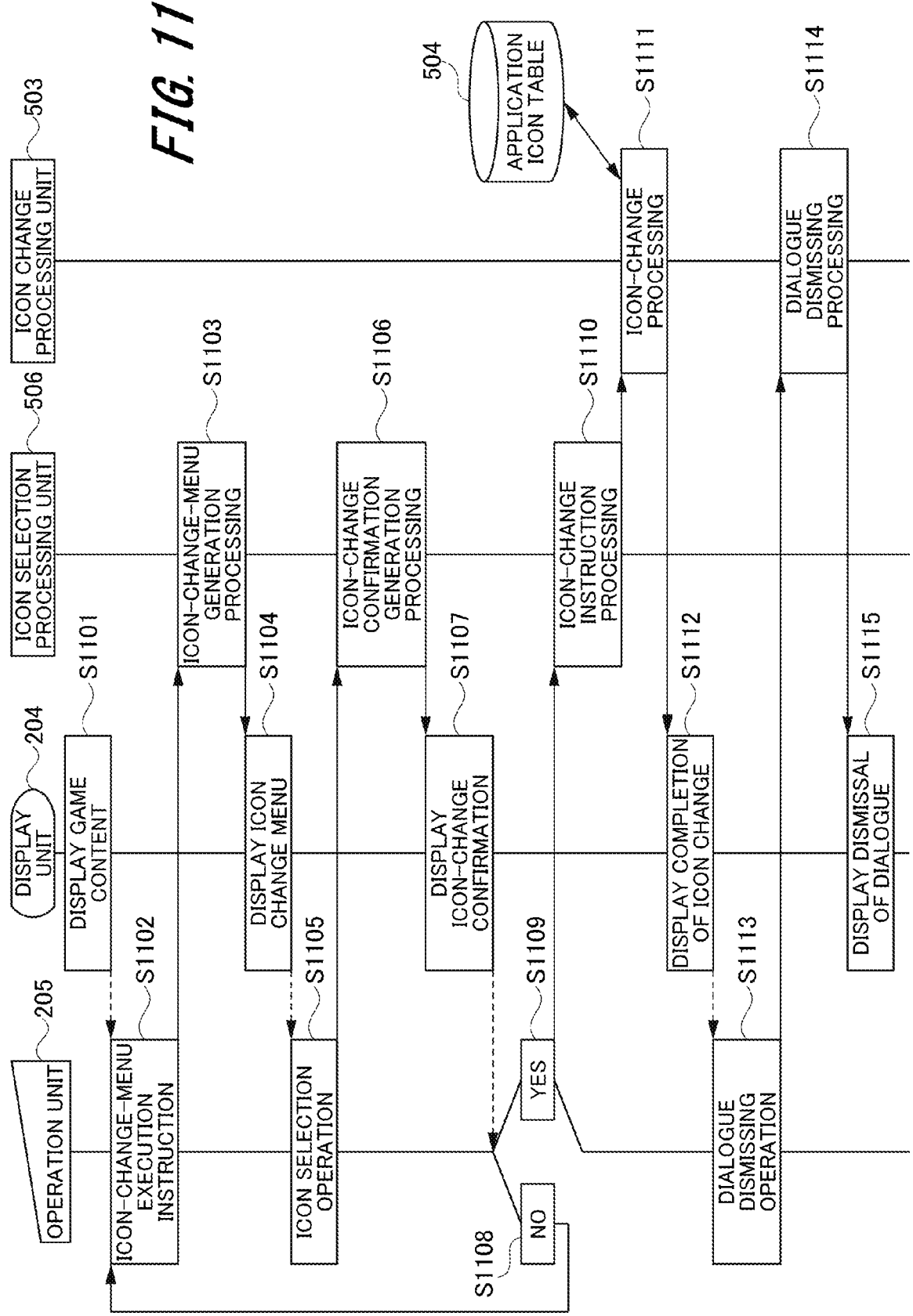
FIG. 11 is a timing chart for explaining the flow of processing, performed in the content playback device, in which the user selects an icon for a change.

FIG. 11 is a timing chart for explaining the flow of processing that is performed in the content playback device 102 and in which the user selects an icon for a change.

In a state in which the game content is displayed on the display unit 204 (S1101), when the user performs an operation for calling up an icon change menu (S1102), the content playback processing unit 502 activates the icon selection processing unit 506.

Then, the icon selection processing unit 506 generates an icon change menu (S1103), and the icon change menu is displayed on the display unit 204 (S1104).

Next, when the user performs an operation for selecting, from among selectable characters, one character that seems to be a favorite character (S1105), the icon selection processing unit 506 generates a dialog box for confirming the icon change (S1106). Then, an icon-change confirmation dialog box that includes a "YES" button and a "NO" button indicating whether to confirm the icon change is displayed on the display unit 204 (S1107).

If the user selects the "NO" button for not changing the icon (S1108), the flow returns again to the icon-change menu screen in Step S1102.

If the user selects the "YES" button for changing the icon (S1109), in response to this instruction, the icon selection processing unit 506 sends an instruction for icon change to the icon change processing unit 503 in the input/output control unit 501, together with the icon file name (S1110). Then, the icon change processing unit 503 writes the icon file name to the application icon table 504 (S1111) and displays, on the display unit 204, a message dialog box that indicates completion of the icon change and that includes an "OK" button for dismissing the message dialog box (S1112).

Next, when the user performs an operation for dismissing the message by tapping the "OK" button in the message dialog box (S1113), the icon change processing unit 503 dismisses the message dialog box displayed on the display unit 204 (S1114, S1115).

Through the processing described above, the icon change processing is accomplished.

Figure 12:
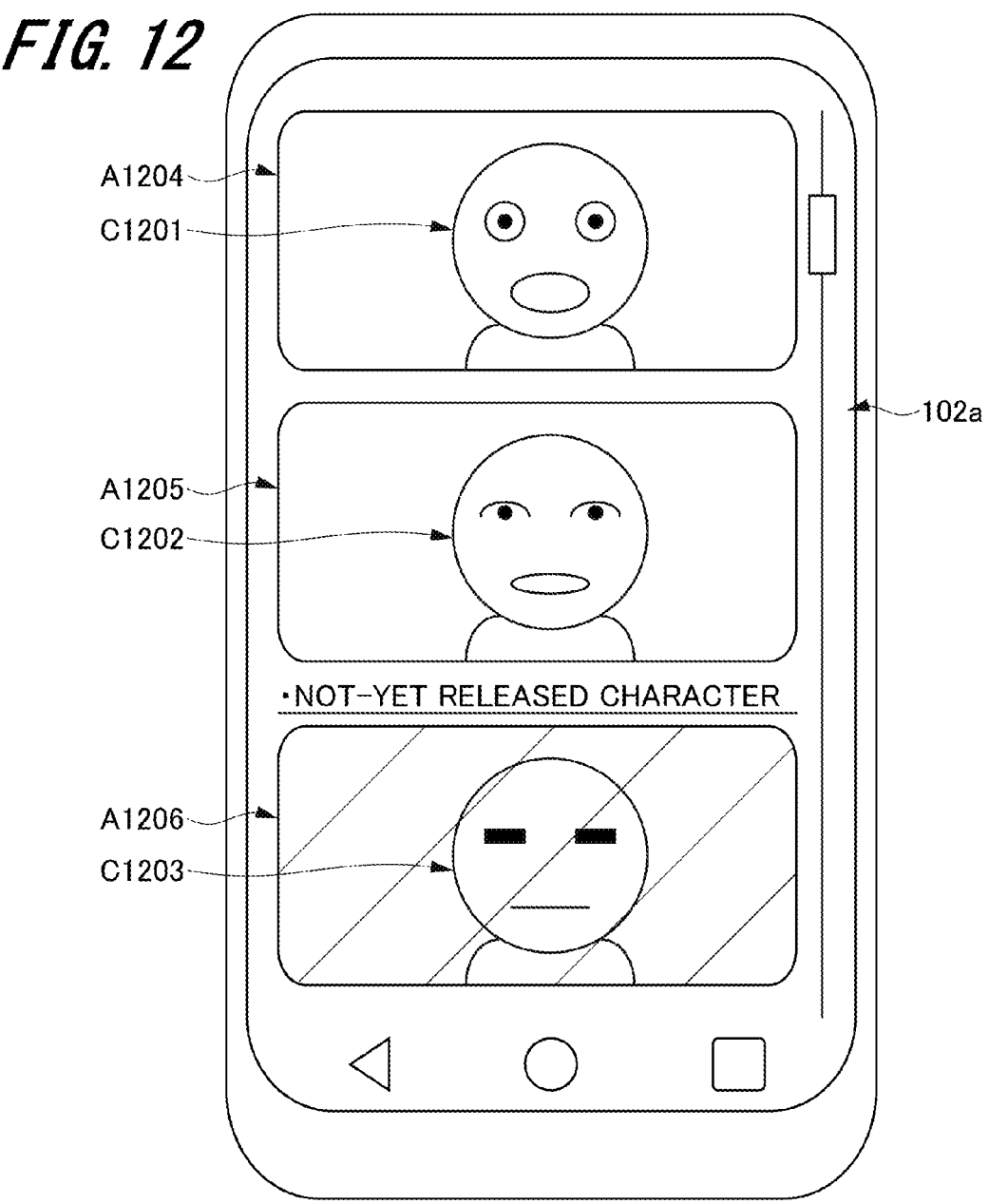
FIG. 12 shows an example of an icon selection screen in the content playback device.

FIG. 12 shows an example of an icon selection screen in the content playback device 102.

In FIG. 12, a first character C1201, a second character C1202, and a third character C1203 are displayed on the touchscreen display 102*a*.

Since the first character C1201 and the second character C1202 are characters for each of which the icon-setting flag is set to logical "true", character display windows A1204 and A1205 are displayed brightly. Then, the first character C1201 and the second character C1202 can be selected as icon-setting characters.

In contrast to this, the third character C1203 is a character for which the icon-setting flag is set to logical "false". Thus, a character display window A1206 is grayed out in order to indicate that the third character C1203 cannot be selected as an icon-setting character.

Furthermore, in another example, it is also possible to adopt a method (not shown) in which a character for which the icon-setting flag is set to "false" is not displayed in the icon selection screen.

FIG. 13A shows an example screen that the application launch processing unit 511 displays on the touchscreen display 102*a* before the icon change processing is executed.

FIG. 13B shows an example screen that the application launch processing unit 511 displays on the touchscreen display 102*a* after the icon change processing is executed.

FIG. 13B shows a state in which the user has changed the first character C1201, which is a default icon of the content playback processing unit 502, to the second character C1202, which is a favorite character of the user.

In the content playback device 102 and the content playback system 101 according to the embodiment of the present invention, although a description has been given of an example case in which a smartphone is used, the device in which the present invention can be carried out is not limited to a smartphone. The present invention can also be carried out in digital devices to which an audio playback device can be connected, such as handheld game consoles, personal computers, etc.

In the above-described embodiment, although the content playback system 101, which is configured of the content playback device 102 and the game server 103, has been illustrated, the present invention can be carried out in a stand-alone game that does not have the game server 103.

Specifically, the game-content arithmetic processing unit 403, the status arithmetic processing unit 404, and the status table 406, which are implemented in the game server 103, need to be implemented in the content playback device 102. In that case, since it is the stand-alone type, user authentication performed by the user-authentication processing unit 402 and the user master 405 is not needed.

In the embodiment of the present invention, the content playback device 102, the content playback system 101, and the content playback program for realizing the content playback device are disclosed.

The user selects a single character that is a favorite character, from among characters for each of which the already-obtained flag and the icon-setting flag are both set to logical true, whereby the icon of the favorite character can be set as a game-application launcher icon, on the menu screen displayed by the application launch processing unit 511. Through this processing, the character toward which the user has a strong feeling can be set as a game-application launcher icon, in accordance with the progress status of a game, whereby enhancement of the user's good feeling with respect to the game can be highly expected.

Although the embodiment of the present invention has been described above, the present invention is not limited to the above-described embodiment, and other modifications and applications are also encompassed without departing from the gist of the present invention cited in claims.

REFERENCE SIGNS LIST

101 content playback system, 102 content playback device, 102*a* touchscreen display, 103 game server, 104 Internet, 105 base station, 106 wireless LAN router, 201 CPU, 202 ROM, 203 RAM, 204 display unit, 205 operation unit, 206 wide-area wireless communication unit, 207 wireless LAN interface, 208 non-volatile storage, 209 bus, 301 CPU, 302 ROM, 303 RAM, 304 display unit, 305 operation unit, 306 NIC, 308 non-volatile storage, 309 bus, 401 input/output control unit, 402 user-authentication processing unit, 403 game-content arithmetic processing unit, 404 status arithmetic processing unit, 405 user master, 406 status table, 501 input/output control unit, 502 content playback processing unit, 503 icon change processing unit, 504 application icon table, 505 game-content execution processing unit, 506 icon selection processing unit, 507 icon-candidate display processing unit, 508 game database, 509 icon image file group, 510 default-icon image file, 511 application launch processing unit, 512 application menu table, 513 application-icon display processing unit, 601 character master, 602 character data master, 603 character parameter table, 604 character flag table.

105: BASE STATION
106: WIRELESS LAN ROUTER
204: DISPLAY UNIT
205: OPERATION UNIT
206: WIDE-AREA WIRELESS COMMUNICATION UNIT
207: WIRELESS LAN I/F
208: NON-VOLATILE STORAGE
304: DISPLAY UNIT
305: OPERATION UNIT
308: NON-VOLATILE STORAGE
401: INPUT/OUTPUT CONTROL UNIT
402: USER-AUTHENTICATION PROCESSING UNIT
403: GAME-CONTENT ARITHMETIC PROCESSING UNIT
404: STATUS ARITHMETIC PROCESSING UNIT
405: USER MASTER
406: STATUS TABLE
204: DISPLAY UNIT
205: OPERATION UNIT
501: INPUT/OUTPUT CONTROL UNIT
502: CONTENT PLAYBACK PROCESSING UNIT
503: ICON CHANGE PROCESSING UNIT
504: APPLICATION ICON TABLE
505: GAME-CONTENT EXECUTION PROCESSING UNIT
506: ICON SELECTION PROCESSING UNIT
507: ICON-CANDIDATE DISPLAY PROCESSING UNIT
508: GAME DATABASE
509: ICON IMAGE FILE GROUP
510: DEFAULT-ICON IMAGE FILE

511: APPLICATION LAUNCH PROCESSING UNIT
512: APPLICATION MENU TABLE
513: APPLICATION-ICON DISPLAY PROCESSING UNIT
601: CHARACTER MASTER
602: CHARACTER DATA MASTER
603: CHARACTER PARAMETER TABLE
604: CHARACTER FLAG TABLE
504: APPLICATION ICON TABLE
512: APPLICATION MENU TABLE
S702: ISSUE SPECIFIED-CHARACTER ID AND REGISTER SPECIFIED-CHARACTER ID IN STATUS TABLE
S703: REGISTER STATUS INFORMATION IN SEND QUEUE OF NEW CHARACTER DUE TO COMPLETION OF EVENT OR ONLINE PURCHASE
S802: GENERATE CHARACTER ID RANDOMLY
S803: NEW CHARACTER ID?
S804: ISSUE CHARACTER ID AND REGISTER CHARACTER ID IN STATUS TABLE
S805: ISSUE ITEM AND REGISTER ITEM IN STATUS TABLE
S806: REGISTER STATUS INFORMATION IN SEND QUEUE DUE TO ONLINE PRIZE COMPETITION
S902: CALCULATE STATUS INFORMATION FROM EVENT INFORMATION
S903: IS THERE NEW CHARACTER ID THAT CAN BE REGISTERED AS ICON?
S904: ISSUE ICON-SETTING FLAG AND REGISTER ICON-SETTING FLAG IN STATUS TABLE
S905: REGISTER STATUS INFORMATION IN SEND QUEUE INFORMATION OF CHARACTER THAT CAN BE SET AS ICON
103: GAME SERVER
204: DISPLAY UNIT
205: OPERATION UNIT
406: STATUS TABLE
505: GAME-CONTENT EXECUTION PROCESSING UNIT
508: GAME DATABASE
S1001: GAME-CONTENT EXECUTION PROCESSING
S1002: GAME-CONTENT DISPLAY PROCESSING
S1003: GAME-CONTENT OPERATION
S1004: GENERATE OR UPDATE EVENT INFORMATION
S1005: EVENT-INFORMATION TRANSMISSION PROCESSING
S1006: RECEPTION OF EVENT INFORMATION, AND STATUS ARITHMETIC PROCESSING
S1007: CHARACTER'S-PARAMETER-AND-FLAG TRANSMISSION PROCESSING
S1008: CHARACTER'S-PARAMETER-AND-FLAG RECEPTION PROCESSING
204: DISPLAY UNIT
205: OPERATION UNIT
503: ICON CHANGE PROCESSING UNIT
504: APPLICATION ICON TABLE
506: ICON SELECTION PROCESSING UNIT
S1101: DISPLAY GAME CONTENT
S1102: ICON-CHANGE-MENU EXECUTION INSTRUCTION
S1103: ICON-CHANGE-MENU GENERATION PROCESSING
S1104: DISPLAY ICON CHANGE MENU
S1105: ICON SELECTION OPERATION
S1106: ICON-CHANGE CONFIRMATION GENERATION PROCESSING
S1107: DISPLAY ICON-CHANGE CONFIRMATION
S1110: ICON-CHANGE INSTRUCTION PROCESSING
S1111: ICON-CHANGE PROCESSING
S1112: DISPLAY COMPLETION OF ICON CHANGE
S1113: DIALOGUE DISMISSING OPERATION
S1114: DIALOGUE DISMISSING PROCESSING
S1115: DISPLAY DISMISSAL OF DIALOGUE

The invention claimed is:

1. A non-transitory computer readable medium comprising a content playback program, the content playback program being configured to be executed by a computer, and comprising:
a character data master that describes correspondence relationships between character IDs that uniquely identify a plurality of characters and file names of icon image files that show icon images linked with the characters of the character IDs,
a character flag table that describes correspondence relationships among the character IDs, already-obtained flags indicating whether the characters of the character IDs have already been obtained by a user, icon-setting flags indicating whether the characters of the character IDs can be set as an icon of an application program, and icon-specification flags indicating whether the characters of the character IDs have been specified as an icon of an application program, and
an application icon table that describes a correspondence relationship between information uniquely pointing to an application program and an icon file name indicating a file name of an icon image pointing to the application program,
wherein the content playback program is configured to perform a method comprising:
referring to the character flag table and displaying, on the display unit, the icon image files that are linked with the character IDs for which the values of the icon-setting flags are set to logical true;
setting, in response to the fact that the user has selected, via the operation unit, one of the plurality of icon images displayed on the display unit, the value of the icon-specification flag, in the character flag table, linked with the character ID selected by the user, to logical true;
registering the icon image file, in the character data master, linked with the character ID selected by the user, to the icon file name obtained from the application icon table, in response to calling of the icon selection processing function; and
displaying the icon image of the icon image file on the display unit as an icon for launching the application program, in accordance with the application icon table,
wherein the already-obtained flags can each be set to logical true by executing a character acquisition event for setting the already-obtained flag to logical true, and
wherein the icon-setting flags can each be set to logical true by executing a predetermined event for setting the icon-setting flag to logical true.

2. The non-transitory computer readable medium according to claim 1,
wherein the character data master comprises:
a character-ID field that stores character IDs that uniquely identify a plurality of characters, and an icon-image field that stores file names of icon image files that show icon images linked with the characters of the character IDs, wherein the character flag table comprises:
- the character-ID field,
- an already-obtained-flag field that stores already-obtained flags indicating whether the characters of the character IDs have already been obtained by a user,
- an icon-setting-flag field that stores icon-setting flags indicating whether the characters of the character IDs can be set as an icon of an application program,
- an icon-specification-flag field that stores icon-specification flags indicating whether the characters of the character IDs have been specified as an icon of an application program, and
- an already-obtained-flag field that stores already-obtained flags indicating whether the characters have already been obtained, and wherein the application icon table comprises:
- an application-name field that stores an application program, and
- an icon-file-name field that stores a file name of an icon image pointing to the application program.

3. A content playback device comprising:

a display unit;

an operation unit;

a character data master that describes correspondence relationships between character IDs that uniquely identify a plurality of characters and file names of icon image files that show icon images linked with the characters of the character IDs;

a character flag table that describes correspondence relationships among the character IDs, already-obtained flags indicating whether the characters of the character IDs have already been obtained by a user, icon-setting flags indicating whether the characters of the character IDs can be set as an icon of an application program, and icon-specification flags indicating whether the characters of the character IDs have been specified as an icon of an application program;

an application icon table that describes a correspondence relationship between information uniquely pointing to an application program and an icon file name indicating a file name of an icon image pointing to the application program, an icon-candidate display processing unit that refers to the character flag table and that displays, on the display unit, the icon image files that are linked with the character IDs for which the values of the icon-setting flags are set to logical true;

an icon selection processing unit that sets, in response to the fact that the user has selected, via the operation unit, one of the plurality of icon images displayed on the display unit, the value of the icon-specification flag, in the character flag table, linked with the character ID selected by the user, to logical true;

an icon change processing unit that registers the icon image file, in the character data master, linked with the character ID selected by the user, to the icon file name obtained from the application icon table, in response to calling of the icon selection processing unit; and an application launch processing unit that displays the icon image of the icon image file on the display unit as an icon for launching the application program, in accordance with the application icon table, wherein the character data master comprises:
- a character-ID field that stores character IDs that uniquely identify a plurality of characters, and
- an icon-image field that stores file names of icon image files that show icon images linked with the characters of the character IDs, wherein the character flag table comprises:
- the character-ID field,
- an already-obtained-flag field that stores already-obtained flags indicating whether the characters of the character IDs have already been obtained by the user,
- an icon-setting-flag field that stores icon-setting flags indicating whether the characters of the character IDs can be set as an icon of an application program,
- an icon-specification-flag field that stores icon-specification flags indicating whether the characters of the character IDs have been specified as an icon of an application program, and
- an already-obtained-flag field that stores already-obtained flags indicating whether the characters have already been obtained, wherein the application icon table comprises:
- an application-name field that stores an application program, and
- an icon-file-name field that stores a file name of an icon image pointing to the application program, wherein the already-obtained flags can each be set to logical true by executing a character acquisition event for setting the already-obtained flag to logical true, and wherein the icon-setting flags can each be set to logical true by executing a predetermined event for setting the icon-setting flag to logical true.

\* \* \* \* \*